(12) United States Patent
Hu et al.

(10) Patent No.: US 10,498,578 B2
(45) Date of Patent: *Dec. 3, 2019

(54) SYSTEM AND METHOD FOR FREQUENCY SYNCHRONIZATION OF DOPPLER-SHIFTED SUBCARRIERS

(71) Applicant: Conversant Intellectual Property Management Inc., Ottawa (CA)

(72) Inventors: Hanwu Hu, Ottawa (CA); Nima Ahmadvand, Ottawa (CA)

(73) Assignee: Conversant Intellectual Property Management Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,215

(22) Filed: Aug. 30, 2018

(65) Prior Publication Data

US 2019/0013987 A1 Jan. 10, 2019

Related U.S. Application Data

(63) Continuation of application No. 14/801,146, filed on Jul. 16, 2015, now Pat. No. 10,091,044.

(Continued)

(51) Int. Cl.
*H04L 27/26* (2006.01)

(52) U.S. Cl.
CPC ...... *H04L 27/2657* (2013.01); *H04L 27/2671* (2013.01); *H04L 27/2675* (2013.01); *H04L 27/2692* (2013.01)

(58) Field of Classification Search
CPC ....... H04L 27/2657; H04L 2027/0048; H04W 56/0035
See application file for complete search history.

(56) References Cited

U.S. PATENT DOCUMENTS

2007/0133699 A1* 6/2007 Roh .................... H04L 27/2657
375/260
2007/0268976 A1* 11/2007 Brink .................. H04B 1/7183
375/260

(Continued)

OTHER PUBLICATIONS

Michele Morelli, C.-C. Jay Kuo and Man-On Pun, "Synchronization Techniques for Orthogonal Frequency Division Multiple Access (OFDMA): A Tutorial Review", University of Pisa, Italy, University of Southern California, and Princeton University, Proceedings of the IEEE, vol. 95, No. 7, Jul. 2007 (Year: 2007).*

*Primary Examiner* — Aristocratis Fotakis
(74) *Attorney, Agent, or Firm* — Borden Ladner Gervais LLP; Shin Hung

(57) ABSTRACT

A method includes receiving an Orthogonal Frequency Division Multiplexing (OFDM) signal comprising a plurality of Doppler-shifted OFDM subcarriers and determining frequency-shift data corresponding to the plurality of Doppler-shifted OFDM subcarriers. The determining includes calculating frequency-shift data for each Doppler-shifted OFDM subcarrier of the plurality of Doppler-shifted OFDM subcarriers, thereby yielding a plurality of subcarrier-specific frequency-shift values and calculating an average of the plurality of subcarrier-specific frequency-shift values. The method further includes frequency shifting each subcarrier of the plurality of Doppler-shifted OFDM subcarriers by a value based on the determined frequency-shift data multiplied by a frequency index of each subcarrier.

17 Claims, 12 Drawing Sheets

Related U.S. Application Data

(60) Provisional application No. 62/025,650, filed on Jul. 17, 2014.

(56) References Cited

U.S. PATENT DOCUMENTS

| | | | |
|---|---|---|---|
| 2015/0029874 A1* | 1/2015 | Davydov | H04W 28/24 370/252 |
| 2016/0020936 A1* | 1/2016 | Hu | H04L 27/2657 375/260 |
| 2017/0310522 A1* | 10/2017 | Lee | H04L 27/22 |

\* cited by examiner

SYSTEM AND METHOD FOR FREQUENCY SYNCHRONIZATION OF DOPPLER-SHIFTED SUBCARRIERS

CROSS-REFERENCE TO RELATED APPLICATION

This application is a continuation of U.S. application Ser. No. 14/801,146, filed on Jul. 16, 2015, which claims the benefit under 35 U.S.C. § 119(e) of U.S. Provisional Application No. 62/025,650, filed Jul. 17, 2014, entitled "System and Method for Frequency Synchronization of Doppler-Shifted Subcarriers", which are herein incorporated by reference.

BACKGROUND

Technical Field

The present invention relates generally to wireless communications, and more particularly, but not by way of limitation, to systems and methods for frequency synchronization of Doppler-shifted subcarriers.

History of Related Art

A wireless communications system may use an Orthogonal Frequency Division Multiplexing ("OFDM") transmission scheme. In a wireless communication system that employs an OFDM transmission scheme, a digital data stream is divided into multiple substreams and each substream is sent in parallel over a different subcarrier frequency. The subcarrier frequencies are chosen such that the subcarriers are orthogonal to one another. Because the data is transmitted over multiple frequencies, systems that employ an OFDM transmission scheme ("OFDM systems") may generally be considered to be in the category of multicarrier systems, as opposed to single-carrier systems, in which data is transmitted on one carrier frequency.

One advantage of OFDM is the ability to efficiently transmit data over frequency-selective channels by employing Inverse Fast Fourier transform ("IFFT") and Fast Fourier transform ("FFT") algorithms. OFDM receivers can use digital signal processors and a relatively simple channel-equalization method (e.g., a one-tap multiplier for each tone) as opposed to more complex equalizers typically used by single-carrier receivers. The orthogonality of OFDM subcarriers also increases spectral efficiency and enhances resilience to multipath fading. However, despite such advantages, OFDM systems may be more timing-offset sensitive than single-carrier systems. Also, demodulation of a signal with carrier-frequency offset can cause a high bit-error rate and may degrade performance of a symbol synchronizer in an OFDM system.

SUMMARY

In one embodiment, a method includes receiving an Orthogonal Frequency Division Multiplexing (OFDM) signal comprising a plurality of Doppler-shifted OFDM subcarriers and determining frequency-shift data corresponding to the plurality of Doppler-shifted OFDM subcarriers. The determining includes calculating frequency-shift data for each Doppler-shifted OFDM subcarrier of the plurality of Doppler-shifted OFDM subcarriers, thereby yielding a plurality of subcarrier-specific frequency-shift values and calculating an average of the plurality of subcarrier-specific frequency-shift values. The method further includes frequency shifting each subcarrier of the plurality of Doppler-shifted OFDM subcarriers by a value based on the determined frequency-shift data multiplied by a frequency index of each subcarrier.

In one embodiment, one or more non-transitory computer-readable storage media embodying logic when executed by a processor is configured to receive an Orthogonal Frequency Division Multiplexing (OFDM) signal comprising a plurality of Doppler-shifted OFDM subcarriers and determine frequency-shift data corresponding to the plurality of Doppler-shifted OFDM subcarriers. The determination includes calculation of frequency-shift data for each Doppler-shifted OFDM subcarrier of the plurality of Doppler-shifted OFDM subcarriers, thereby yielding a plurality of subcarrier-specific frequency-shift values and calculation of an average of the plurality of subcarrier-specific frequency-shift values. One or more non-transitory computer-readable storage media is further configured to frequency shift each subcarrier of the plurality of Doppler-shifted OFDM subcarriers by a value based on the determined frequency-shift data multiplied by a frequency index of each subcarrier.

In one embodiment, a system includes an Orthogonal Frequency Division Multiplexing (OFDM) receiver configured to receive an OFDM signal comprising a plurality of Doppler-shifted OFDM subcarriers and a subcarrier frequency-shift estimator interoperably coupled to the OFDM receiver, the subcarrier frequency-shift estimator is configured to determine frequency-shift data corresponding to the plurality of Doppler-shifted OFDM subcarriers. The determination includes calculation of frequency-shift data for each Doppler-shifted OFDM subcarrier of the plurality of Doppler-shifted OFDM subcarriers, thereby yielding a plurality of subcarrier-specific frequency-shift values and calculation of an average of the plurality of subcarrier-specific frequency-shift values. The system further includes a frequency shift bank interoperably coupled to the OFDM receiver and the subcarrier frequency-shift estimator, wherein the frequency shift bank is configured to frequency shift each subcarrier of the plurality of Doppler-shifted OFDM subcarriers by a value based on the determined frequency-shift data multiplied by a frequency index of each subcarrier.

BRIEF DESCRIPTION OF THE DRAWINGS

A more complete understanding of the method and apparatus of the various embodiments may be obtained by reference to the following Detailed Description when taken in conjunction with the accompanying Drawings wherein.

DETAILED DESCRIPTION OF ILLUSTRATIVE EMBODIMENTS

Figure 1:
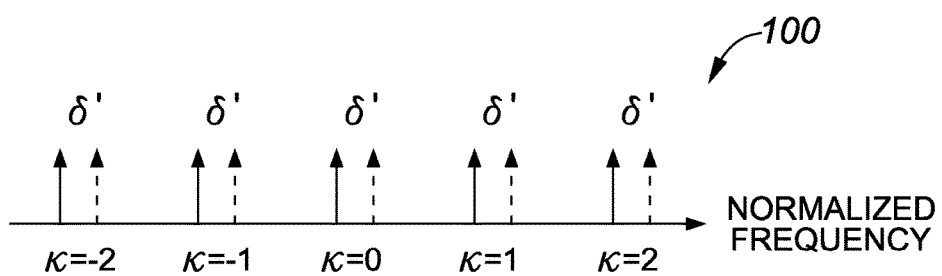
FIG. 1 illustrates an exemplary normalized frequency spectrum of a typical wireless OFDM communications transmission that is viewed as experiencing an identical frequency shift.

Methods and systems have been proposed for OFDM timing and frequency synchronization. However, many frequency-synchronization schemes fail to accurately compensate for different amounts of Doppler shift that can be experienced among OFDM subcarriers in wireless communications. Like reference numerals correspond to like components throughout the following Detailed Description and accompanying Drawings.

FIG. 1 illustrates an exemplary normalized frequency spectrum 100 of a typical wireless OFDM communications transmission that is viewed as experiencing an identical frequency shift. Solid spectral lines represent subcarriers as perceived at a transmitter (not shown), while dashed lines represent the subcarriers as perceived at a receiver (not shown). For a stationary communications system (i.e., a system in which the receiver and transmitter are not in motion relative to each other) an identical frequency offset δ' may be, for example, a result of a difference in transmission and reception clock-oscillator frequencies. For a non-stationary communications system (i.e., a system in which the transmitter and receiver are in motion relative to each other) δ' may be based, for example, on an estimated average or otherwise uniform Doppler shift of the entire system. In any event, some non-stationary communications systems compensate frequencies of all received subcarriers by the same uniform amount when decoding communications and ignore the fact that different subcarriers actually experience different amounts of Doppler shift.

Figure 2:
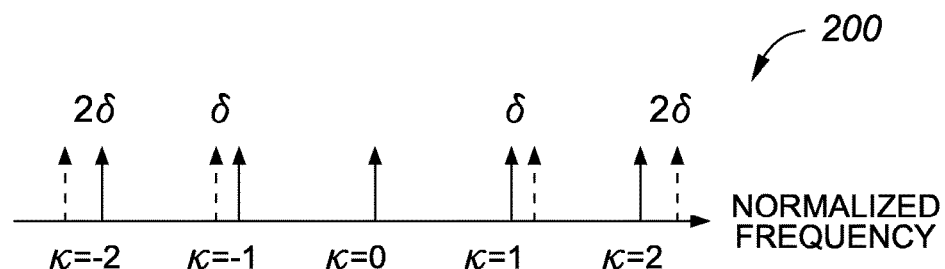
FIG. 2 illustrates an exemplary normalized frequency spectrum of a typical wireless OFDM communications transmission that experiences Doppler shift.

FIG. 2 illustrates an exemplary normalized frequency spectrum 200 of a typical wireless OFDM communications transmission that experiences Doppler shift. For a non-stationary wireless communications system, the frequency shift experienced due to Doppler shift (i.e., "Doppler effect") $\Delta f_D$ may generally be expressed as follows:

$$\Delta f_D = \frac{v}{c} f \quad (1)$$

where v is a velocity, for example, of a mobile station relative to a base station, c is the speed of light, and f is a radio frequency the mobile station receives. The amount of Doppler shift experienced by a particular subcarrier is thus seen to be proportional to the frequency of the subcarrier.

In FIG. 2, solid spectral lines represent subcarriers as perceived at a transmitter, dashed lines represent the subcarriers as perceived at a receiver, and δ is a factor related to the velocity of the mobile station relative to the base station. As such, a normalized frequency $f_\kappa$ of each Doppler-shifted subcarrier of the OFDM communications transmission ("Doppler-shifted OFDM subcarrier") may be expressed as follows:

$$f_\kappa = \kappa + \kappa \cdot \delta \quad (1A)$$

For example, consider a mobile station on a high-speed train moving toward a cellular tower or a base station at 400 km/hr. If the mobile station is on a Long Term Evolution ("LTE") network, where the subcarrier spacing at a base-station transmitter is 15 kHz with primary-synchronization-signal channel ("PSCH") and secondary-synchronization-signal channel ("SSCH") consisting of 63 subcarriers with a central DC carrier, the amount of Doppler shift could amount to as much as +620 Hz for the 63rd subcarrier. Conversely, if the mobile station moves away from the base station at 400 km/hr, the 63rd subcarrier could experience as much as −620 Hz of Doppler shift.

In an OFDM system, the received signal samples r(n) affected by Doppler shift may be expressed as follows:

$$r(n) = \frac{1}{N} \sum_{\kappa=-K}^{K} S_\kappa H_\kappa e^{2\pi j n (\kappa + \kappa \delta)/N} \quad (2)$$

where there are 2K+1 subcarriers, $S_\kappa$ is a modulation value for each subcarrier at an IFFT stage in the transmitter, $H_\kappa$ is a transfer function of a channel at the κth carrier frequency, N is the FFT size, K is the carrier index, and a normalized frequency-to-carrier spacing κ·δ denotes the normalized subcarrier frequency offset to the carrier spacing due to Doppler shift, and δ is a factor related to the velocity of the mobile station relative to the base station.

Figure 3:
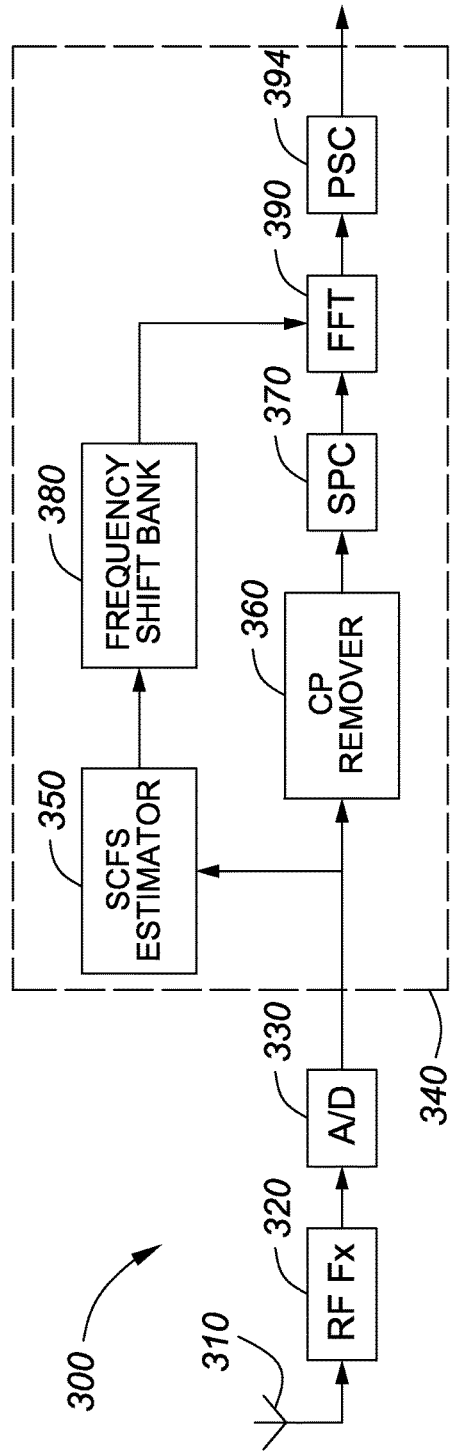
FIG. 3 is a block diagram of an exemplary system for frequency synchronization of Doppler-shifted OFDM subcarriers.

FIG. 3 is a block diagram of an exemplary system 300 for frequency synchronization of Doppler-shifted OFDM subcarriers. The system 300 includes an antenna 310, a radio frequency ("RF") receiver 320 operably coupled to the antenna 310, an analog-to-digital (A/D) converter 330 operably coupled to the receiver 320, and a digital signal processor ("DSP") 340 operably coupled to the A/D converter 330. The antenna 310 collects wireless OFDM transmissions (e.g., OFDM signals comprising first and second parts) and provides related analog signals to the receiver 320. The receiver 320 receives analog signals from the antenna 310 and provides related analog signals to the A/D converter 330. The A/D converter 330 receives analog signals from the receiver 320 and provides related digital sample data to the DSP 340. The DSP 340 receives digital sample data from the A/D converter 330 and demodulates the received digital sample data from the A/D converter 330.

In a typical embodiment, the DSP 340 is operable to frequency-synchronize Doppler-shifted OFDM subcarriers. To this end, a typical embodiment of the DSP 340 includes a subcarrier frequency-shift estimator ("SCFS estimator") 350 operably coupled to the A/D converter 330, a cyclic-prefix remover 360 operably coupled to the A/D converter 330, a serial-to-parallel converter ("SPC") 370 operably coupled to the cyclic prefix remover 360, and a frequency-shift bank 380 operably coupled to the SCFS estimator 350. The DSP 340 also includes a 2K+1 subcarrier and N point complex FFT processor 390 operably coupled to the frequency-shift bank 380 and the SPC 370. The DSP 340 also includes a parallel-to-serial converter ("PSC") 394 operably coupled to the FFT processor 390.

In a typical embodiment, the SCFS estimator 350 receives digital-sample data from the A/D converter 330, generates subcarrier frequency-offset information related thereto, and provides the subcarrier frequency-offset information to the frequency-shift bank 380. The cyclic prefix remover 360 removes cyclic prefixes from OFDM bit streams and selectively saves and discards the cyclic prefixes. The SPC 370 converts serial data into parallel data. In a typical embodiment, the frequency shift bank 380 receives the subcarrier frequency-offset information from the SCFS estimator 350 and shifts corresponding OFDM subcarrier frequencies based on the subcarrier frequency-offset information received from the SCFS estimator 350. The FFT processor 390 executes FFT algorithms, while the PSC 394 converts parallel data into serial data. Although exemplary components of the DSP 340 are described herein as logically distinct, in some embodiments, various components of the DSP 340 may be implemented with shared resources and may be implemented in hardware, software, firmware, or any suitable combination thereof, or in any other suitable manner.

Figure 4:
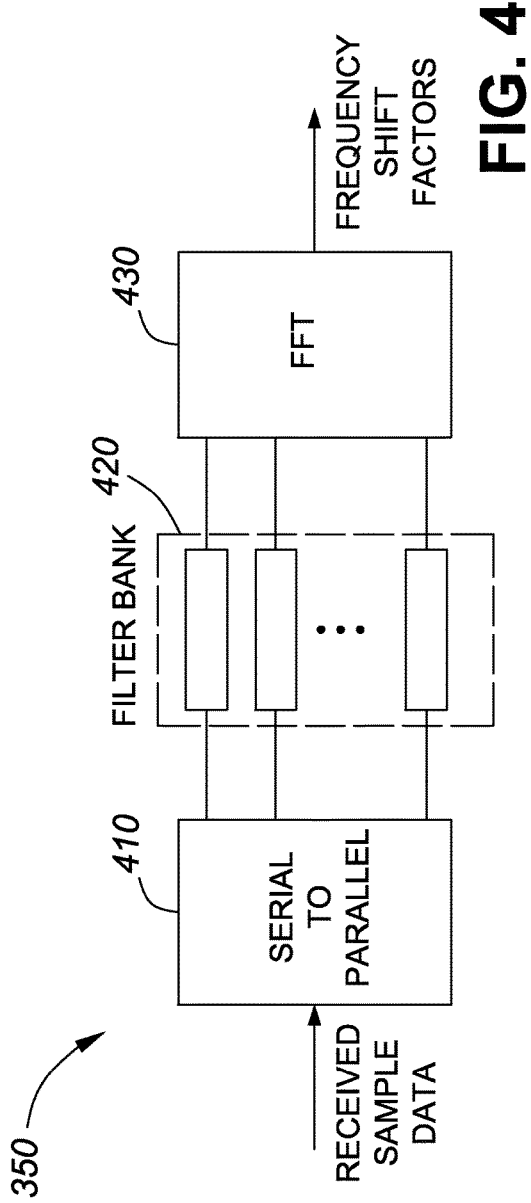
FIG. 4 is a block diagram of an exemplary subcarrier frequency-shift estimator (SCFS) of FIG. 3.

FIG. 4 is a block diagram of the exemplary SCFS estimator 350 of FIG. 3. In a typical embodiment, the SCFS estimator 350 includes a serial-to-parallel converter ("SPC") 410 operably coupled to the A/D converter 330, a bandpass filter bank ("BFB") 420 operably coupled to the SPC 410, and a 2K+1 subcarrier and N point complex FFT processor 430 operably coupled to the BFB 420. The SPC 410 converts serial data into parallel data. The BFB 420 filters the OFDM subcarrier signals received from the SPC 410. For example, the BFB 420 may include a plurality of bandpass filters, with each of the filters having a center frequency corresponding to each respective subcarrier and having a passband less than the subcarrier spacing. The FFT processor 430 executes FFT algorithms. The FFT processor 430 may be thought of as logically distinct from the FFT processor 390. However, in various embodiments, one or more of the FFT processors 390 and 430 could be combined. For example, in some embodiments, the FFT processor 390 can perform the functionality of the FFT processor 430 or vice versa.

When the OFDM signal expressed in Equation (2) is input, for example, into an FFT processor with a repeated period (e.g., a double OFDM symbol or an OFDM symbol plus a cyclic prefix), the result may be expressed as follows:

$$R_{1q} = \frac{1}{N} \sum_{\kappa=-K}^{K} S_\kappa H_\kappa C_\kappa \quad (3)$$

$$R_{2q} = \frac{1}{N} \sum_{\kappa=-K}^{K} S_\kappa H_\kappa C_\kappa e^{2\pi j \kappa \delta} \quad (4)$$

$$C_\kappa = \sum_{n=0}^{L-1} e^{2\pi j n (\kappa + \kappa \delta - q)/N} \quad (5)$$

where where $R_{1q}$ and $R_{2q}$ are FFT outputs of first and second (repeated) period for a q-th subcarrier, respectively, at the receiver.

Further, in view of Equations (3), (4), and (5), in a typical embodiment, the SCFS estimator 350 applies the BPF 420 filter before the FFT processor 430, and the FFT processor 430 produces, to the q-th subcarrier, the following:

$$R_{1q} = \frac{1}{N} X_q H_q C_q \quad (6)$$

$$R_{2q} = \frac{1}{N} X_q H_q C_q e^{2\pi j q \delta} \quad (7)$$

where $$C_q = \sum_{n=0}^{L} e^{2\pi j n q \delta/N} \quad (8)$$

Further, for an additive white Gaussian noise ("AWGN") channel environment, Equations (6) and (7) may be expressed as:

$$Y_{1q} = R_{1q} + W_{1q} \quad (9)$$

$$Y_{2q} = R_{2q} + \omega_{2q} = R_{1q} e^{2\pi j q \delta} + W_{2q} \quad (10)$$

where $W_{1q}$ and $W_{2q}$ are additive white Gaussian noises within the first and second periods, respectively, on the q-th subcarrier channel.

A maximum likelihood estimate $\hat{\delta}$ of a Doppler frequency shift factor $\delta$ at subcarrier channel q may be expressed as follows:

$$\hat{\delta} = \frac{1}{2\pi q} \tan^{-1}\left\{\frac{\mathrm{Im}(Y_{2q} Y_{1q}^*)}{\mathrm{Re}(Y_{2q} Y_{1q}^*)}\right\} \quad (11)$$

As such, in a typical embodiment, the SCFS estimator 350 calculates the maximum likelihood estimate $\hat{\delta}_s$ of an entire-system Doppler frequency shift factor $\delta_s$ by averaging the maximum likelihood estimates of Doppler frequency shift factor $\hat{\delta}$ over all channels as follows:

$$\hat{\delta}_s = \frac{1}{2K} \sum_{\substack{q=-K \\ q \neq 0}}^{K} \frac{1}{2\pi q} \tan^{-1}\left\{\frac{\mathrm{Im}(Y_{2q} Y_{1q}^*)}{\mathrm{Re}(Y_{2q} Y_{1q}^*)}\right\} \quad (12)$$

In a typical embodiment, the SCFS estimator 350 calculates the frequency offset of each subcarrier, based, for example, on a discrete Fourier transform ("DFT") of each subcarrier channel on first repeat period $Y_{1q}$ and second repeat period $Y_{2q}$ by multiplying the average maximum likelihood estimate of the Doppler frequency shift factor $\hat{\delta}_s$ by κ, where κ is the subcarrier channel index.

In a typical embodiment, the SCFS estimator 350 provides the frequency offset of each subcarrier to the frequency-shift bank 380. The frequency-shift bank 380 uses the frequency offsets to correspondingly dynamically shift the subcarrier frequencies of the FFT processor 390 to compensate for the Doppler shift.

The system 300 provides frequency synchronization of Doppler-shifted OFDM subcarriers based on either an OFDM symbol and a repeated OFDM symbol or based on a cyclic prefix and a corresponding portion of an OFDM symbol. In the former case, the entire symbol is repeated. In the latter case, an effective portion of the symbol is sufficiently repeated by the cyclic prefix.

Figure 5:
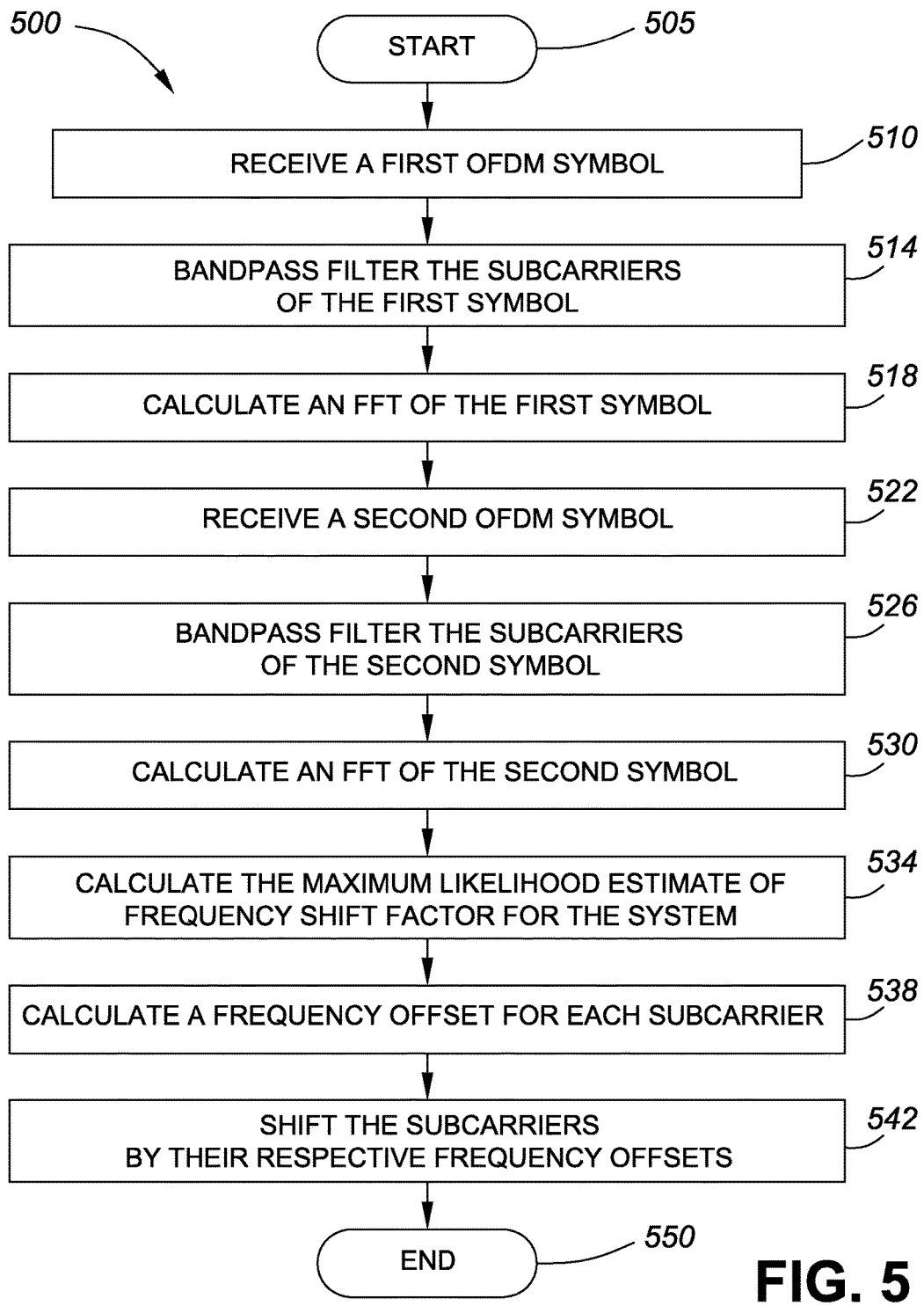
FIG. 5 is a flow diagram of an exemplary process that includes synchronization of Doppler-shifted OFDM subcarriers based on an OFDM symbol and a repeated OFDM symbol.

FIG. 5 is a flow diagram of an exemplary process 500 that includes synchronization of Doppler-shifted OFDM subcarriers based on an OFDM symbol and a repeated OFDM symbol. By way of example, the process 500 can be performed in whole or in part by the system 300 of FIG. 3. For illustrative purposes, the process 500 will be described relative to FIGS. 3-4.

The process 500 starts at block 505. At block 510, a first OFDM symbol is received. At block 514, subcarriers of the first OFDM symbol are bandpass filtered, for example, via the BFB 420. At block 518, an FFT value of the first symbol $R_{1q}$ is calculated, for example, according to Equation (6). At block 522, a second OFDM symbol is received. At block 526, subcarriers of the second OFDM symbol are bandpass filtered, for example, via the BFB 420. At block 530, an FFT value of the second symbol $R_{2q}$ is calculated according to Equation (7). At block 534, the maximum likelihood estimate $\hat{\delta}_s$ of the entire-system Doppler frequency shift factor $\delta_s$ is calculated based, for example, on $R_{1q}$ and $R_{2q}$, white Gaussian noises, and an average of maximum likelihood estimates $\hat{\delta}$ of the Doppler frequency shift factor $\delta$ over all channels, according to Equations (11) and (12). In a typical embodiment, the maximum likelihood estimate $\hat{\delta}_s$ of the entire-system Doppler frequency shift factor $\delta_s$ is calculated, for example, via the SCFS estimator 350. At block 538, the frequency offset is calculated for each subcarrier by multiplying by κ the maximum likelihood estimate $\hat{\delta}_s$, where κ is the subcarrier channel index. At block 542, the subcarriers of the FFT processor 390 are shifted by their respective frequency offsets, for example, via the frequency-shift bank 380. The process 500 ends at block 550.

Figure 6:
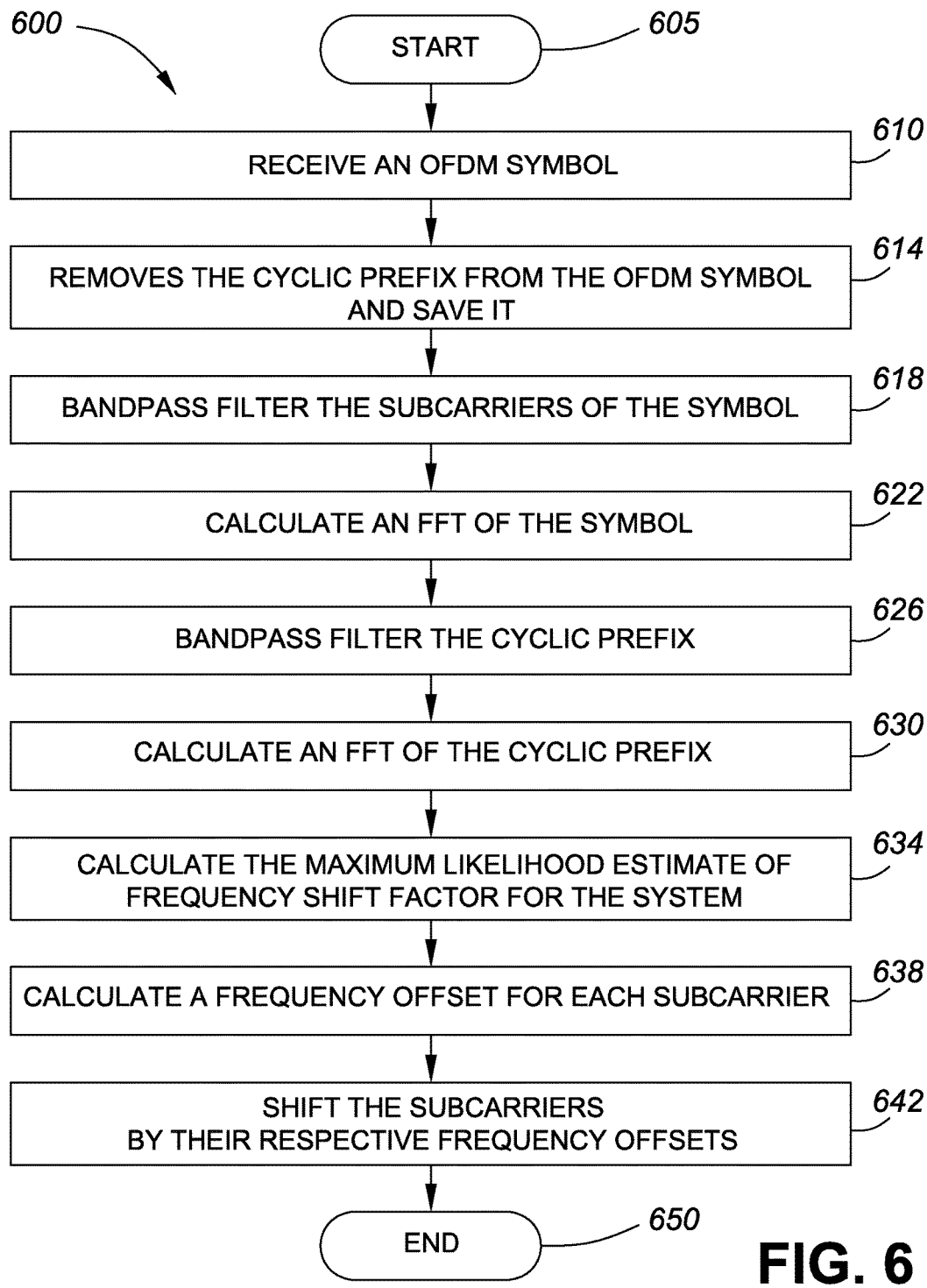
FIG. 6 is a flow diagram of an exemplary process that includes synchronization of Doppler-shifted OFDM subcarriers based on an OFDM symbol and cyclic prefix.

FIG. 6 is a flow diagram of an exemplary operational process 600 that includes synchronization of Doppler-shifted OFDM subcarriers based on an OFDM symbol and cyclic prefix. By way of example, the process 600 can be performed in whole or in part by the system 300 of FIG. 3. For illustrative purposes, the process 600 will be described relative to FIGS. 3-4.

The process 600 starts at block 605. At block 610, a first OFDM symbol is received. At block 614, the cyclic prefix from the first OFDM symbol is removed and saved, for example, by the cyclic prefix remover 360. At block 618, the subcarriers of the first OFDM symbol are bandpass filtered, for example, via the BFB 420. At block 622, an FFT value of the first symbol $R_{1q}$ is calculated according to Equation (6). At block 626, the cyclic prefix of the symbol is bandpass filtered, for example, via the BFB 420. At block 630, an FFT value of the cyclic prefix $R_{2q}$ is calculated, for example, according to Equation (7). At block 634, a maximum likelihood estimate $\hat{\delta}_s$ of the entire-system Doppler frequency shift factor $\delta_s$ is calculated based on, for example, $R_{1q}$ and $R_{2q}$, white Gaussian noises, and an average of maximum likelihood estimates $\hat{\delta}$ of the Doppler frequency shift factor $\delta$ over all channels, according to Equations (11) and (12). In a typical embodiment, the maximum likelihood estimate $\hat{\delta}_s$ of the entire-system Doppler frequency shift factor for $\delta_s$ is calculated, for example, via the SCFS estimator 350. At block 638, the frequency offset for each subcarrier is calculated by multiplying by κ the maximum likelihood estimate $\hat{\delta}_s$, where κ is the subcarrier channel index. At block 642, the subcarriers of the FFT processor are shifted by their respective frequency offsets, for example, via the frequency shift bank 380. The process 600 ends at block 650.

Figure 7:
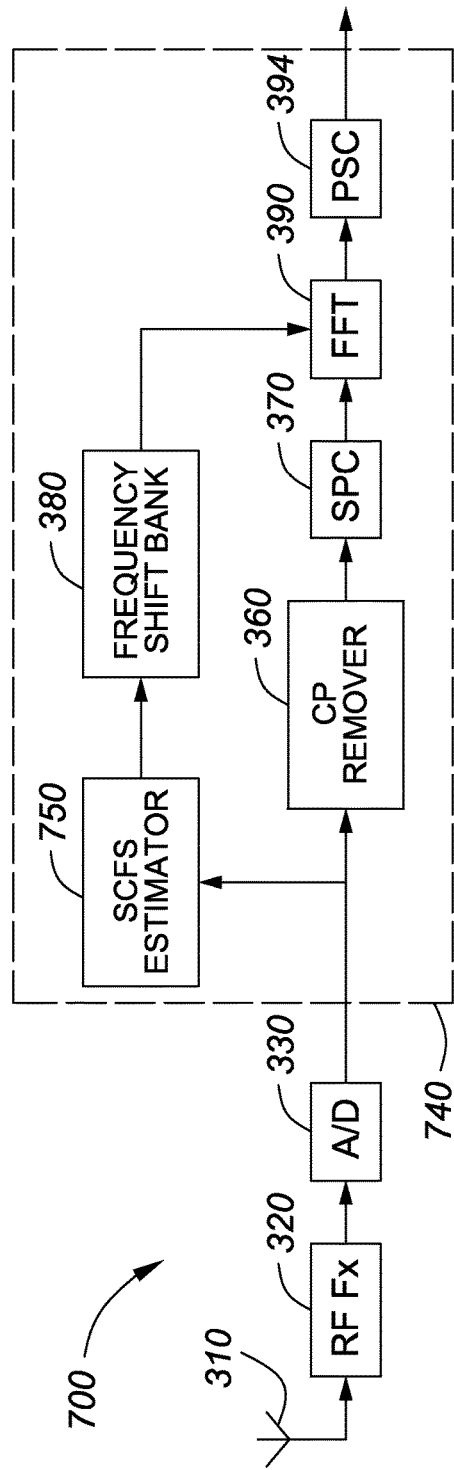
FIG. 7 is a block diagram of an exemplary system for frequency synchronization of Doppler-shifted OFDM subcarriers.

FIG. 7 is a block diagram of an exemplary system 700 for frequency synchronization of Doppler-shifted OFDM subcarriers. In a typical embodiment, the system 700 and various components of system 700 have similar functionalities to system 300 and corresponding components of FIG. 3 discussed above. However, the system 700 includes an alternate embodiment of a subcarrier frequency-shift estimator ("SCFS estimator") 750 as part of a DSP 740. Details of the SCFS 750 will be described below relative to FIG. 8. The system 700 includes an antenna 310, a radio frequency ("RF") receiver 320 operably coupled to the antenna 310, an analog-to-digital (A/D) converter 330 operably coupled to the receiver 320, and the DSP 740 operably coupled to the A/D converter 330.

In a typical embodiment, the DSP 740 is operable to frequency-synchronize Doppler-shifted OFDM subcarriers. To this end, a typical embodiment of the DSP 740 includes the SCFS estimator 750 operably coupled to the A/D converter 330, a cyclic-prefix remover 360 operably coupled to the A/D converter 330, a serial-to-parallel converter ("SPC") 370 operably coupled to the cyclic prefix remover 360, and a frequency-shift bank 380 operably coupled to the SCFS estimator 350. The DSP 740 also includes a 2K+1 subcarrier and N point complex FFT processor 390 operably coupled to the frequency-shift bank 380 and the SPC 370. The DSP 740 also includes a parallel-to-serial converter ("PSC") 394 operably coupled to the FFT processor 390. Although exemplary components of the DSP 740 are described herein as logically distinct, in some embodiments, various components of the DSP 740 may be implemented with shared resources and may be implemented in hardware, software, firmware, or any suitable combination thereof, or in any other suitable manner.

Figure 8:
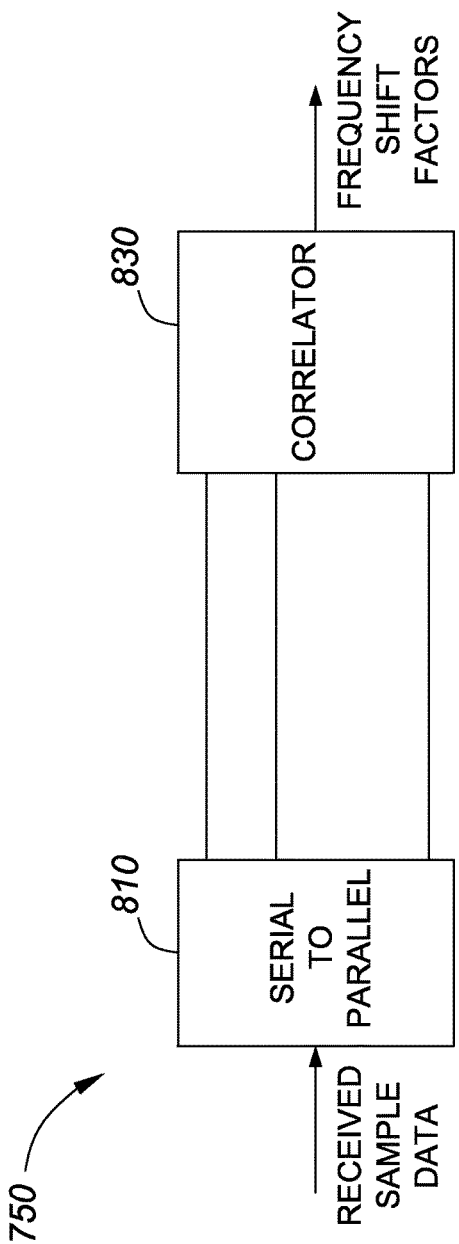
FIG. 8 is a block diagram of an exemplary SCFS estimator of FIG. 7.

FIG. 8 is a block diagram of the SCFS estimator 750. In a typical embodiment, the SCFS estimator 750 includes a serial-to-parallel converter ("SPC") 810 operably coupled to A/D converter 330 and a correlator 830 operably coupled to the SPC 810. The SPC 810 converts serial data into parallel data. The correlator 830 executes correlation algorithms.

The mutual correlation $\Gamma$ and auto-correlation $\Gamma_0$ of the OFDM signal of Equation (2) may be expressed, respectively, as follows:

$$\Gamma = \sum_{n=0}^{L-1} r(n) r^*(n+N) \qquad (13)$$

$$= \frac{1}{N^2} \sum_{\kappa} \sum_{\kappa'} X_\kappa X_{\kappa'}^* H_\kappa H_{\kappa'}^* e^{-2\pi j \kappa' \delta} \sum_{n=0}^{L-1} e^{2\pi j n(\kappa-\kappa')(1+\delta)/N}$$

$$\Gamma_0 = \sum_{n=0}^{L-1} r(n) r^*(n) \qquad (14)$$

$$= \frac{1}{N^2} \sum_{\kappa} \sum_{\kappa'} X_\kappa X_{\kappa'}^* H_\kappa H_{\kappa'}^* \sum_{n=0}^{L-1} e^{2\pi j n(\kappa-\kappa')(1+\delta)/N}$$

For Doppler shifts, the Doppler frequency shift factor δ in Equations (13) and (14) is generally <<1.

If $|X_\kappa|^2$ and $|H_\kappa|^2$ in Equations (13) and (14) are the same for all subcarrier channels, the mutual and auto-correlation Equations (13) and (14) for double OFDM symbols may be expressed as follows:

$$\Gamma = \frac{1}{N}|X_\kappa|^2|H_\kappa|^2 \sum_{\kappa=-K}^{K} e^{-2\pi j\kappa\delta} \quad (15)$$

$$\Gamma_0 = \frac{2K+1}{N}|X_\kappa|^2|H_\kappa|^2 \quad (16)$$

It therefore follows that the mutual correlation may be expressed as follows:

$$\Gamma = \Gamma_0 \cdot \text{sin } c[\pi(2K+1)\delta] \quad (17)$$

where $$\text{sinc}[\pi(2K+1)\delta] = \frac{\sin[\pi(2K+1)\delta]}{\pi(2K+1)\delta}$$

is a sinc function that has a maximum value of 1 at δ=0. When δ=0, there is no frequency offset and the mutual correlation of the first and second OFDM symbols is equal to the auto-correlation of the first OFDM symbol.

Figure 9:
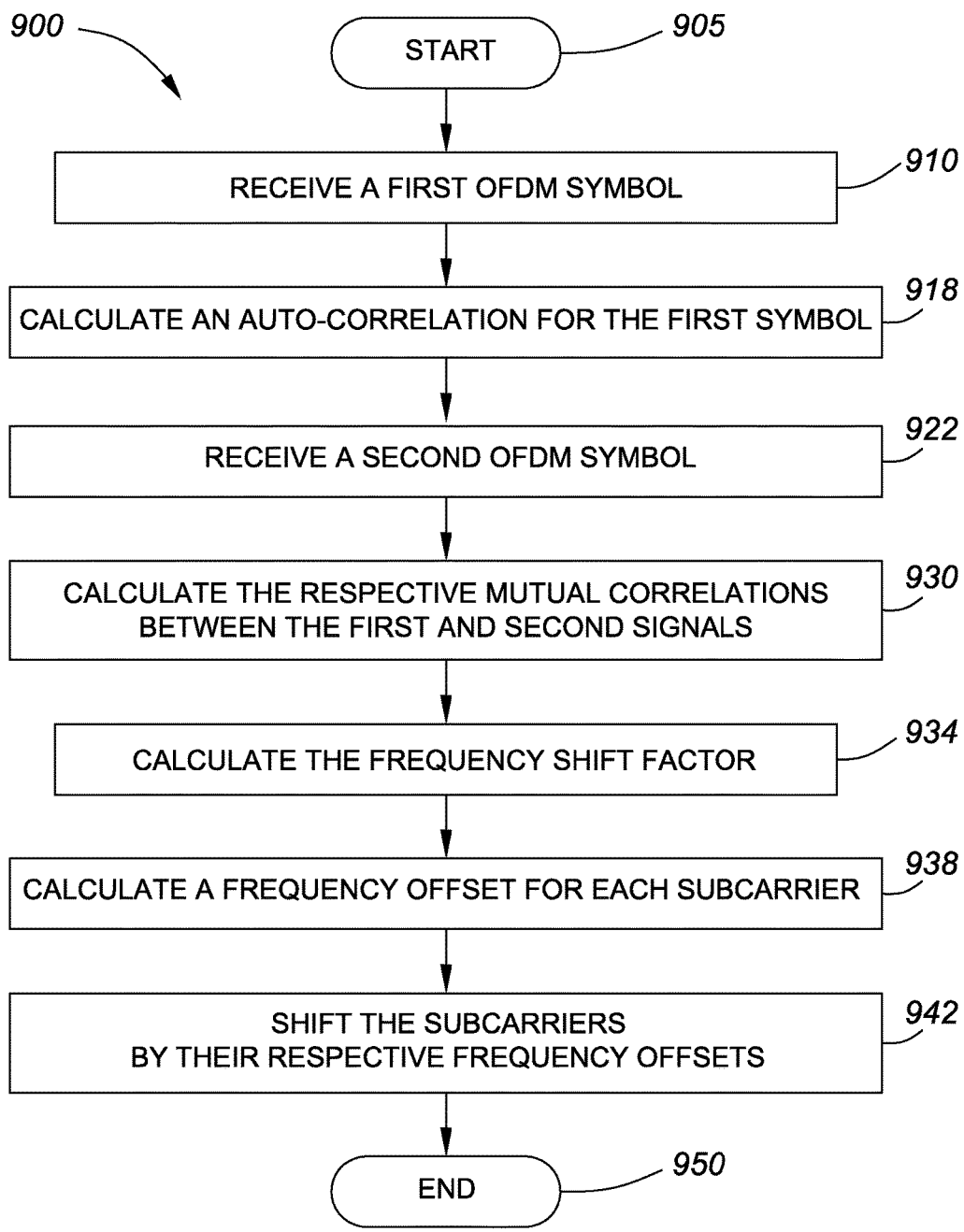
FIG. 9 is a flow diagram of an exemplary process that includes synchronization of Doppler-shifted OFDM subcarriers based on a correlation function of a repeated OFDM symbol.

FIG. 9 is a flow diagram of an exemplary process 900 that includes synchronization of Doppler-shifted OFDM subcarriers based on a correlation function of a repeated OFDM symbol. By way of example, the process 900 can be performed in whole or in part by the system 700. For illustrative purposes, the process 900 will be described relative to FIGS. 7-8.

The process 900 starts at block 905. At block 910, a first OFDM symbol is received. At block 918, an auto-correlation value of the first OFDM symbol is calculated, for example, by the correlator 830. At block 922, a second OFDM symbol is received. At block 930, the respective mutual correlations between the first OFDM symbol and the second OFDM symbol are calculated. At block 934, the Doppler frequency shift factor δ is calculated from Equation (17) using the mutual correlation between the first symbol and the second symbol (Γ) and the auto-correlation of the first symbol (Γ$_0$). At block 938, a frequency offset for each subcarrier is calculated by multiplying by κ the Doppler frequency shift factor δ, where κ is the subcarrier channel index. At block 942, the subcarriers of the FFT processor are shifted by their respective frequency offsets, for example, via the frequency shift bank 380. The process 900 ends at block 950.

Figure 10:
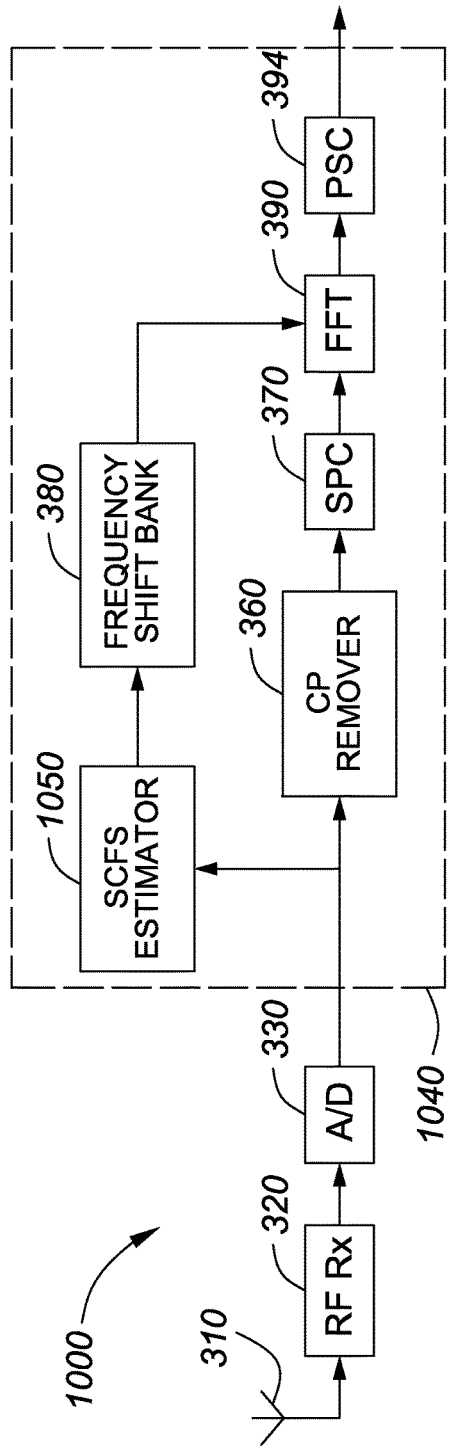
FIG. 10 is a block diagram of an exemplary system for frequency synchronization of Doppler-shifted OFDM subcarriers.

FIG. 10 is a block diagram of an exemplary system 1000 for frequency synchronization of Doppler-shifted OFDM subcarriers. In a typical embodiment, the system 1000 has functionality similar to FIG. 3 discussed above. However, the system 1000 includes an alternate embodiment of a subcarrier frequency shift estimator ("SCFS estimator") 1050 as part of a DSP 1040. Details of the SCFS 1050 will be described in details below relative to FIG. 11. The system 1000 includes an antenna 310, a radio frequency ("RF") receiver 320 operably coupled to the antenna 310, an analog-to-digital (A/D) converter 330 operably coupled to the receiver 320, and the DSP 1040 operably coupled to the A/D converter 330.

In a typical embodiment, the DSP 1040 is operable to frequency-synchronize Doppler-shifted OFDM subcarriers. To this end, a typical embodiment of the DSP 1040 includes the SCFS estimator 1050 operably coupled to the A/D converter 330, a cyclic-prefix remover 360 operably coupled to the A/D converter 330, a serial-to-parallel converter ("SPC") 370 operably coupled to the cyclic prefix remover 360, and a frequency-shift bank 380 operably coupled to the SCFS estimator 350. The DSP 1040 also includes a 2K+1 subcarrier and N point complex FFT processor 390 operably coupled to the frequency-shift bank 380 and the SPC 370. The DSP 1040 also includes a parallel-to-serial converter ("PSC") 394 operably coupled to the FFT processor 390. Although exemplary components of the DSP 1040 are described herein as logically distinct, in some embodiments, various components of the DSP 1040 may be implemented with shared resources and may be implemented in hardware, software, firmware, or any suitable combination thereof, or in any other suitable manner.

Figure 11:
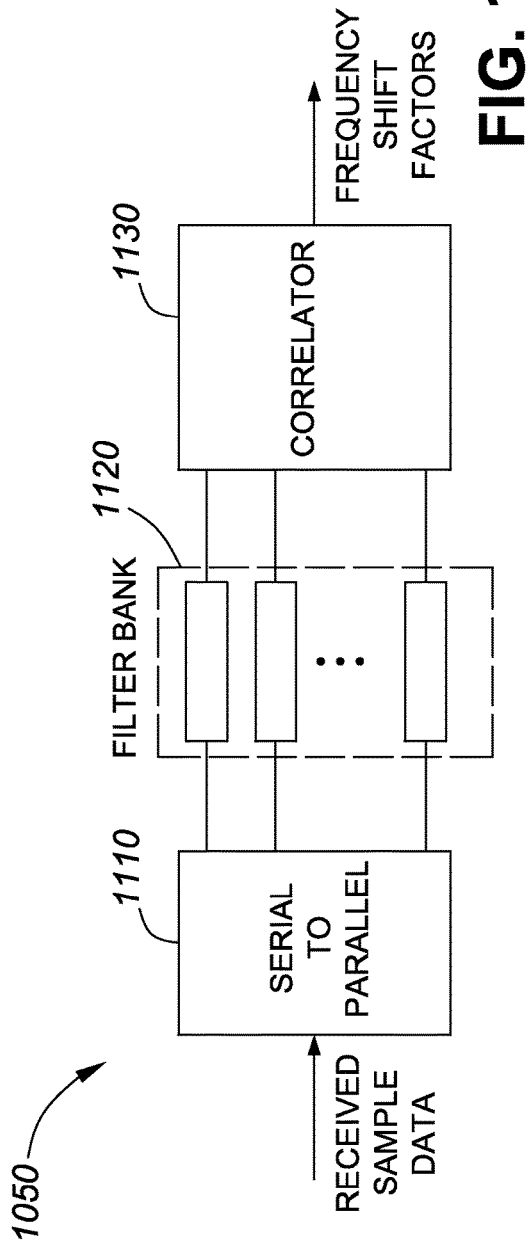
FIG. 11 is a block diagram of an exemplary SCFS estimator of FIG. 10.

FIG. 11 is a block diagram of the SCFS estimator 1050. In a typical embodiment, the SCFS estimator 1050 includes a serial-to-parallel converter ("SPC") 1110 operably coupled to the A/D converter 330. The SCFS estimator 1050 also includes a bandpass filter bank ("BFB") 1120 operably coupled to the SPC 1110 and a correlator 1130 operably coupled to the BFB 1120. The SPC 1110 converts serial data into parallel data. The BFB 1120 filters the OFDM subcarrier signals received from the SPC 1110. For example, the BFB 1120 includes a plurality of bandpass filters. Each of the bandpass filters has a center frequency that corresponds to each respective subcarrier and a passband less than the subcarrier spacing. The correlator 1130 executes correlation algorithms.

Figure 12:
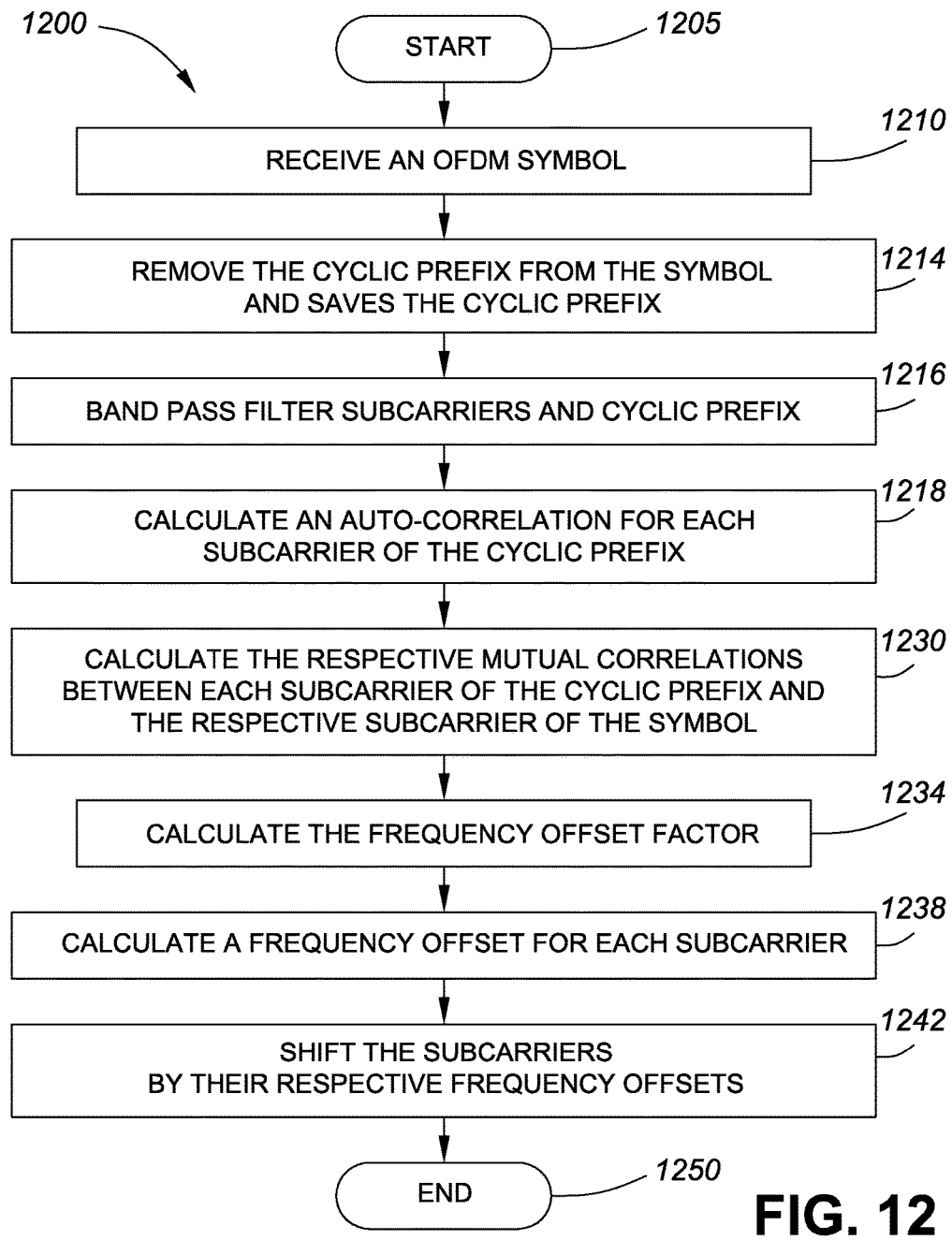
FIG. 12 illustrates a flow diagram of an exemplary operational process that includes synchronization of Doppler-shifted OFDM subcarriers based on a correlation function of a cyclic prefix.

FIG. 12 is a flow diagram of an exemplary process 1200 that includes synchronization of Doppler-shifted OFDM subcarriers based on a correlation function of a cyclic prefix. By way of example, the process 1200 can be performed in whole or in part by the system 1000. For illustrative purposes, the process 1200 will be described relative to FIGS. 10-11.

OFDM subcarriers are typically not orthogonal to each other within a Cyclic Prefix ("CP") because a CP is typically shorter than one OFDM symbol. Therefore, the summation over time (n) in Equations (13) and (14) cannot rely on subcarrier orthogonality for CPs. However, one bandpass filter is applied to every subcarrier channel before the correlator 1130 as shown in FIG. 11. The mutual correlation between an OFDM symbol and its cyclic prefix and the autocorrelation of the cyclic prefix, respectively, may be expressed as follows:

$$\Gamma^q = \frac{1}{N^2}|X_q|^2|H_q|^2 e^{-2\pi jq\delta} \quad (18)$$

$$\Gamma_0^q = \frac{L}{N^2}|X_q|^2|H_q|^2 \quad (19)$$

where $\Gamma^q$ and $\Gamma_0^q$ are the mutual correlation and auto-correlation of q-th subcarrier, respectively. And it should be further appreciated, then, that the maximum likelihood estimate $\hat{\delta}$ of the Doppler frequency shift factor δ at subcarrier channel q may be expressed as follows:

$$\hat{\delta} = -\frac{1}{2\pi q}\tan^{-1}\left\{\frac{\text{Im}(\Gamma_q/\Gamma_0^q)}{\text{Re}(\Gamma_q/\Gamma_0^q)}\right\} \quad (20)$$

An estimate of the maximum likelihood estimate $\hat{\delta}_s$ of the entire-system Doppler frequency shift factor $\delta_s$ with 2K+1 subcarriers may be expressed as follows:

$$\hat{\delta}_s = -\frac{1}{2K} \sum_{\substack{q=-K \\ q \neq 0}}^{K} \frac{1}{2\pi q} \tan^{-1} \left\{ \frac{\text{Im}\left(\frac{\Gamma_q}{\Gamma_0^q}\right)}{\text{Re}\left(\frac{\Gamma_q}{\Gamma_0^q}\right)} \right\} \quad (21)$$

The process 1200 starts at block 1205. At block 1210, an OFDM symbol is received. At block 1214, the cyclic prefix is removed and saved, for example, by the cyclic prefix remover 360. At block 1216, the subcarriers of the OFDM symbol and the cyclic prefix are bandpass filtered, for example, via the BFB 1120. At block 1218, an auto-correlation is calculated for each subcarrier of the cyclic prefix. At block 1230, respective mutual correlations are calculated between each subcarrier of the cyclic prefix and the respective subcarrier of the symbol. At block 1234, the maximum likelihood estimate $\hat{\delta}_s$ of the entire-system Doppler frequency shift factor $\delta_s$ is calculated from Equation (21) using the respective mutual correlations (block 1230) as $\Gamma$ and using the auto-correlation (block 1218) as $\Gamma_0$. At block 1238, a frequency offset is calculated for each subcarrier by multiplying by $\kappa$ the maximum likelihood estimate $\hat{\delta}_s$ where $\kappa$ is the subcarrier channel index. At block 1242, the subcarriers of the FFT processor 390 are shifted by their respective frequency offsets, for example, via the frequency-shift bank 380. The process 1200 ends at block 1250.

Since Equations (20) and (21) are applicable to repeated OFDM symbols as well as to a symbol and its cyclic prefix, another exemplary operational process for the system 1000 (or any other suitable system) includes synchronization of Doppler-shifted OFDM subcarriers based on a repeated OFDM symbol, with the first OFDM symbol being treated in a like manner as the cyclic prefix is treated in the process 1200 and the second (i.e., repeated) OFDM symbol being treated in a like manner as the OFDM symbol is treated in the process 1200.

Figure 13:
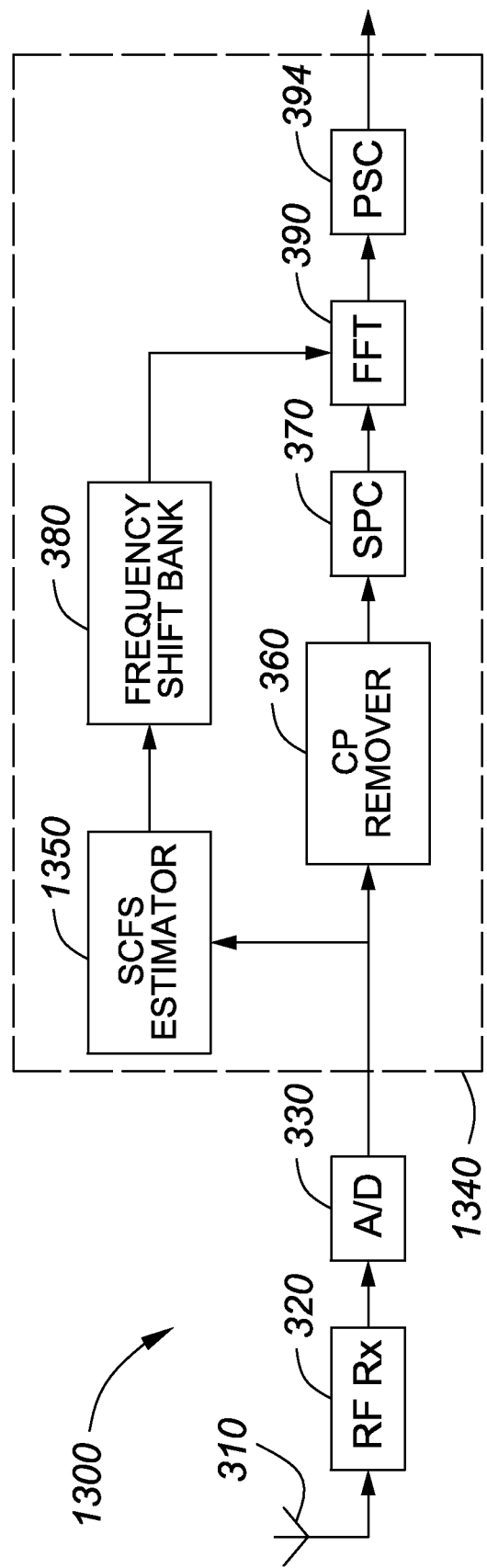
FIG. 13 illustrates a block diagram of an exemplary system for frequency synchronization of Doppler-shifted OFDM subcarriers.

FIG. 13 is a block diagram of an exemplary system 1300 for frequency synchronization of Doppler-shifted OFDM subcarriers. In a typical embodiment, the system 1300 and various components of system 1300 have similar functionalities to system 300 and corresponding components of FIG. 3 discussed above. The system 1300 includes an antenna 310, a radio frequency ("RF") receiver 320 operably coupled to the antenna 310, an analog-to-digital (A/D) converter 330 operably coupled to the receiver 320, and the DSP 1340 operably coupled to the A/D converter 330.

In a typical embodiment, the DSP 1340 is operable to frequency-synchronize Doppler-shifted OFDM subcarriers. To this end, a typical embodiment of the DSP 1340 includes the SCFS estimator 1350 operably coupled to the A/D converter 330, a cyclic-prefix remover 360 operably coupled to the A/D converter 330, a serial-to-parallel converter ("SPC") 370 operably coupled to the cyclic prefix remover 360, and a frequency-shift bank 380 operably coupled to the SCFS estimator 350. The DSP 1340 also includes a 2K+1 subcarrier and N point complex FFT processor 390 operably coupled to the frequency-shift bank 380 and the SPC 370. The DSP 1340 also includes a parallel-to-serial converter ("PSC") 394 operably coupled to the FFT processor 390. Although exemplary components of the DSP 1340 are described herein as logically distinct, in some embodiments, various components of the DSP 1340 may be implemented with shared resources and may be implemented in hardware, software, firmware, or any suitable combination thereof, or in any other suitable manner.

Figure 14:
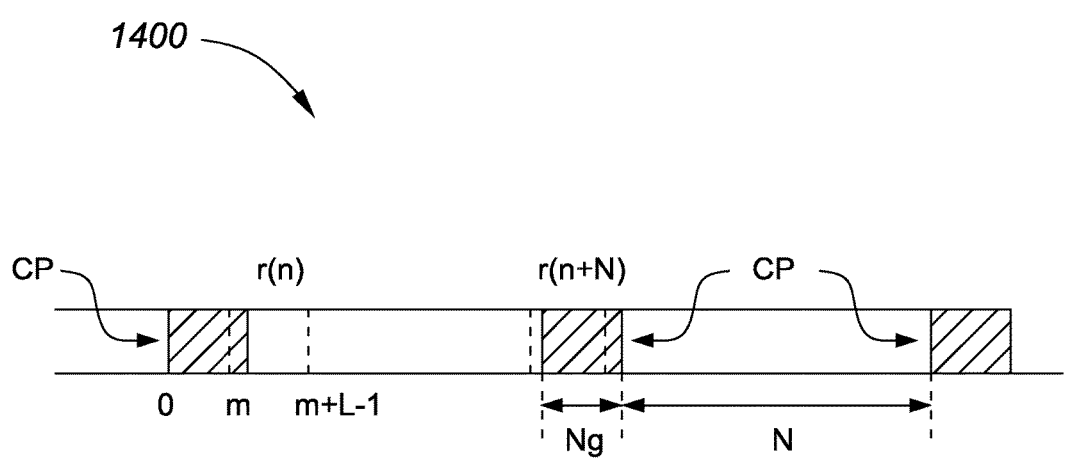
FIG. 14 illustrates a period relation of OFDM signals received by a receiver.

FIG. 14 illustrates a period relation 1400 of OFDM signals received by a receiver. A typical OFDM transmission system uses a cyclic prefix ("CP") to guard against inter-symbol interference ("ISI"). The cyclic prefix is a copy of a last part of an OFDM symbol that precedes the OFDM symbol. A CP is correlated with the last part of the corresponding OFDM symbol and the OFDM symbol length may be found by finding the length of the CP. From Equation (14) it is apparent that, regarding auto-correlation, the Doppler frequency shift $\kappa\delta$ is equivalent to the change of OFDM symbol length from N to N/(1+$\delta$), such that the Doppler frequency shift factor $\delta$ may be expressed as follows:

$$\delta = \frac{N}{N_m} - 1 \quad (22)$$

where $N_m$ is the measured length of the OFDM symbol. The mutual correlation is measured within a CP period length. In FIG. 14, m is a start point of a sampled signal for the mutual correlation. If the value of m is larger than or equal to CP length $N_g$ (i.e., m$\geq N_g$), the received signal r(n) is within the first OFDM symbol while the received r(n+N) is within the second OFDM symbol. The mutual correlation of r(n) and r(n+N) is smallest, and may be expressed as follows:

$$\Gamma(m) = \sum_{n=m}^{m+L-1} r_1(n) r_2^*(n+N) \quad (23)$$

$$= \frac{1}{N^2} \sum_{\kappa} \sum_{\kappa'} X_{1\kappa} X_{2\kappa'}^* H_{1\kappa} H_{2\kappa'}^* e^{2\pi j \kappa'(1+\delta)N_g/N}$$

$$\sum_{n=m}^{m+L-1} e^{2\pi j [n-N_g](\kappa-\kappa')(1+\delta)/N}$$

where L is a window length of measurement for the mutual correlation, $e^{2\pi j \kappa'(1+\delta)N_g/N}$ is a phase shift due to the CP insertion preceding the second OFDM symbol, and $X_{1k}$ and $X_{2k}^*$ are from first and second OFDM symbols, respectively, and it should be appreciated that $X_{1k}$ and $X_{2k}^*$ are independent of each other. Further, it should be appreciated that if $0 \leq m < N_g$, r(n) is within the first OFDM symbol while a part of r(n+N) is within the second OFDM symbol, and that the mutual correlation of r(n) and r(n+N) is larger, and may be expressed as:

$$\Gamma(m) = \sum_{n=m}^{N_g-1} r_1(n) r_1^*(n+N) + \sum_{n=N_g}^{m+L-1} r_1(n) r_2^*(n+N) \text{ at } L > N_g - m \quad (24)$$

$$= \frac{1}{N^2} \sum_{\kappa} \sum_{\kappa'} X_{1\kappa} X_{2\kappa'}^* H_{1\kappa} H_{2\kappa'}^* e^{-2\pi j \kappa' \delta}$$

$$\sum_{n=m}^{N_g-1} e^{2\pi j [n-N_g](\kappa-\kappa')(1+\delta)/N} +$$

$$\frac{1}{N^2} \sum_{\kappa} \sum_{\kappa'} X_{1\kappa} X_{2\kappa'}^* H_{1\kappa} H_{2\kappa'}^* e^{2\pi j \kappa'(1+\delta)N_g/N}$$

$$\sum_{n=N_g}^{m+L-1} e^{2\pi j [n-N_g](\kappa-\kappa')(1+\delta)/N}$$

-continued $$\Gamma(m) = \sum_{n=m}^{m+L-1} r_1(n) r_1^*(n+N) \quad \text{at } L \leq N_g - m \quad (25)$$

$$= \frac{1}{N^2} \sum_K \sum_{K'} X_{1K} X_{2K'}^* H_{1K} H_{2K'}^* e^{-2\pi j k' \delta}$$

$$\sum_{n=m}^{m+L-1} e^{2\pi j[n-N_g)](k-k')(1+\delta)/N}$$

If m=0, both r(n) and r(n+N) are within the first OFDM symbol, even at $L=N_g$. For m=0 and $L=N_g$, the mutual correlation of r(n) and r(n+N) is largest and, thus, the position of m=0, L=CP length $N_g$ and the measured length $N_m$ of the OFDM symbol may be found when the mutual correlation r achieves maximum value.

Figure 15:
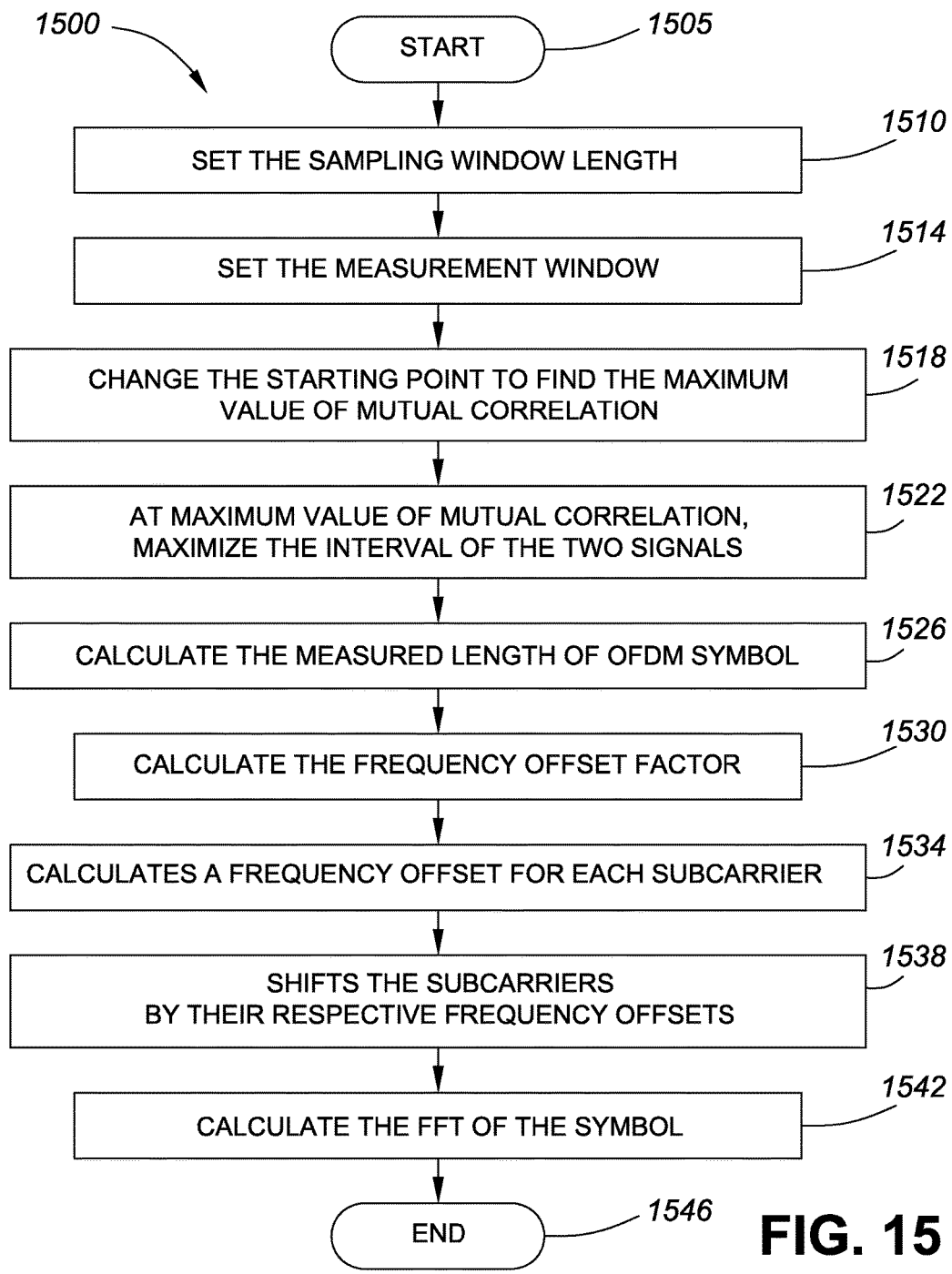
FIG. 15 is a flow diagram of an exemplary process that includes synchronization of Doppler-shifted OFDM subcarriers based on measurement of OFDM symbol length.

FIG. 15 is a flow diagram of an exemplary process 1500 that includes synchronization of Doppler-shifted OFDM subcarriers based on a measurement of OFDM symbol length. By way of example, the process 1500 can be performed in whole or in part by the system 1300. For illustrative purposes, the process 1500 will be described relative to FIGS. 13-14.

The process 1500 starts at step 1505. At block 1510, a sampling window length is set to $2 \cdot N + N_g$ in order to accommodate a CP and the copied part of the OFDM symbol. At block 1514, the system 1300 sets the measurement window such that $L < N_g$ and the interval of the two signals $\Delta T = N$. At block 1518, the system 1300 changes the starting point m to find a maximum value of mutual correlation $\Gamma$. At block 1522, at the maximum $\Gamma$, the system 1300 increases $\Delta T$ to the maximum, which results in m=0. At block 1526, the system 1300 calculates the measured length of OFDM symbol according to the following expression:

$$N_m = (\Delta T + L) \frac{N}{N_g + N} \quad (26)$$

where, in the measurement, the system 1300 selects L to be close to $N_g$ to increase the sensitivity of the mutual correlation.

It is apparent from Equation (26) that the resolution and accuracy of the $N_m$ measurement rely on the increment of $\Delta T$. Therefore, a typical embodiment uses a large OFDM size and a high sampling rate in the transmitter and the receiver. For example, an LTE OFDM system has an OFDM symbol with the length of 66.67 µs and 2048 points while Wi-Fi (802.11a) has OFDM symbol with the length of 3.2 µs and 64 points.

At block 1530, the system 1300 applies Equation (22) to calculate δ. In block 1534, the system 1300 calculates a frequency offset κδ for each subcarrier by multiplying δ by κ, where κ is the subcarrier channel index.

At block 1538, the system 1300 shifts the subcarriers of the FFT processor 390 by the respective frequency offsets. At block 1542, the system 1300 calculates the FFT of the symbol based on the subcarriers that the system 1300 has shifted to compensate for the Doppler shifts if the symbol conveys data.

The foregoing exemplary embodiments assume that the variation in δ is slow enough that the Doppler frequency shift can be considered substantially constant over at least two OFDM symbol periods. The practicality of such an assumption should be appreciated, as typical OFDM symbol lengths are small (e.g., 45.715 µs and 66.7 µs in WMAX and LTE, respectively (i.e., half of the useful symbol time $T_b$)).

Locations of the SCFS estimator 350 and the SCFS estimator 750 are not limited to the locations shown in FIG. 3 and FIG. 7, respectively. For example, as noted above, rather than the separate FFT processor 430, the FFT processor 390 may also be used as an FFT resource for the SCFS estimator 350, and, as noted above, the SCFS estimator 750 and the cyclic prefix remover 760 may be implemented with shared resources.

Figure 16:
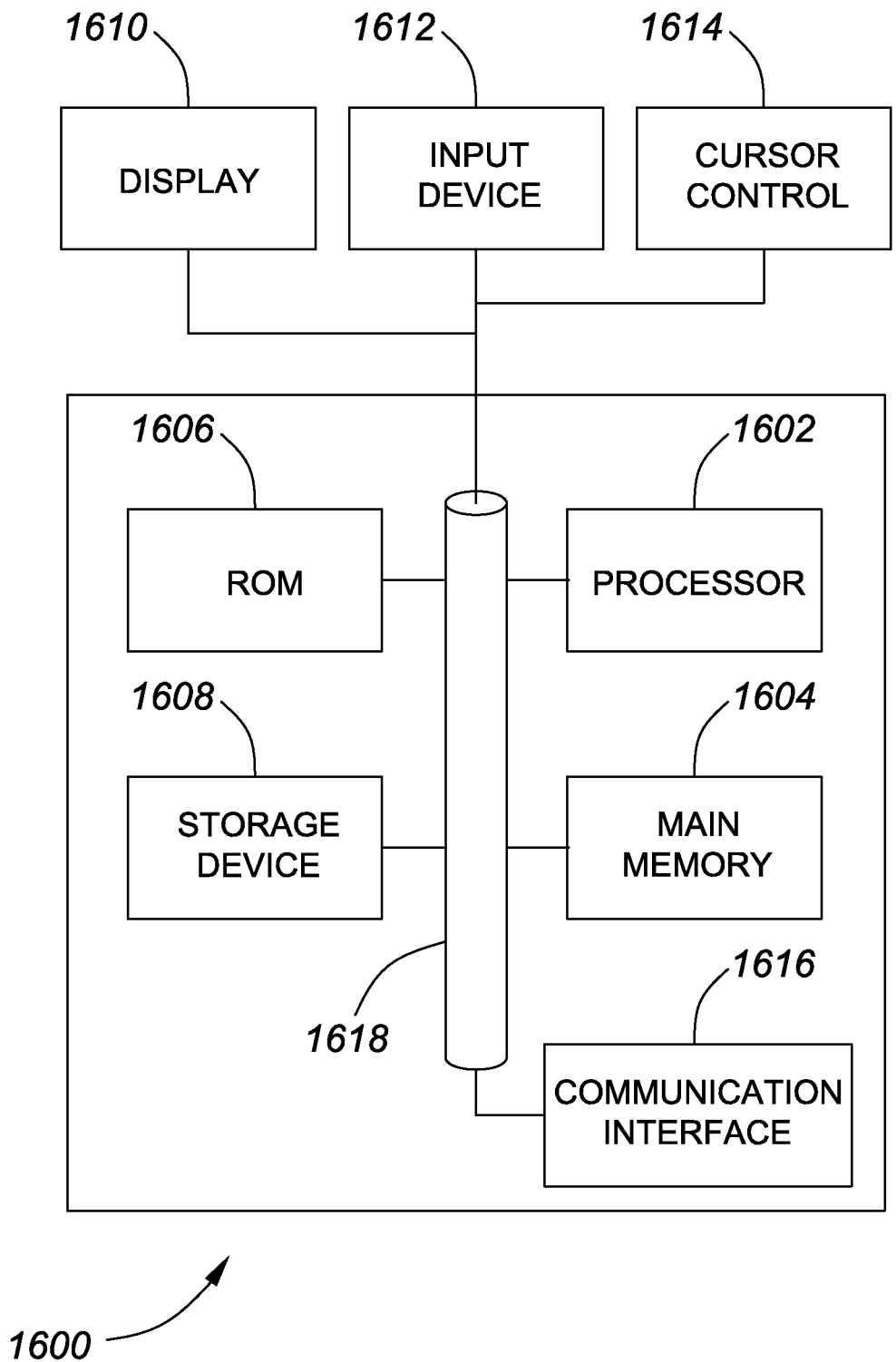
FIG. 16 illustrates an embodiment of a computer system.

FIG. 16 illustrates an embodiment of a computer system 1600 on which various components or systems described herein can be implemented. For example, the computer system 1600 can be used to implement the DSP 340, 740, 1040, or 1340.

The computer system 1600 may be a physical system, a virtual system, or a combination of both physical and virtual systems. The computer system 1600 may include a bus 1618 or other communication mechanism for communicating information and a processor 1602 coupled to the bus 1618 for processing information. The computer system 1600 includes a main memory 1604, such as random-access memory (RAM) or other dynamic storage device, coupled to the bus 1618 for storing computer-readable instructions by the processor 1602.

The main memory 1604 may be used for storing temporary variables or other intermediate information during execution of the instructions to be executed by the processor 1602. The computer system 1600 includes a read-only memory (ROM) 1606 or other static storage device coupled to the bus 1618 for storing static information and instructions for the processor 1602. A computer-readable storage device 1608, such as a magnetic disk or optical disk, is coupled to the bus 1618 for storing information and instructions for the processor 1602. The computer system 1600 may be coupled via the bus 1618 to a display 1610, such as a liquid crystal display (LCD) or a cathode ray tube (CRT), for displaying information to a user. An input device 1612, including, for example, alphanumeric and other keys, is coupled to the bus 1618 for communicating information and command selections to the processor 1602. Another type of user input device is a cursor control 1614, such as a mouse, a trackball, or cursor direction keys for communicating direct information and command selections to the processor 1602 and for controlling cursor movement on the display 1610. The cursor control 1614 typically has two degrees of freedom in two axes, a first axis (e.g., x) and a second axis (e.g., y), that allow the device to specify positions in a plane.

The term "computer readable instructions" as used above refers to any instructions that may be performed by the processor 1602 and/or other component of the computer system 1600. Similarly, the term "computer readable medium" refers to any non-transitory storage medium that may be used to store the computer readable instructions. Such a medium may take many forms, including, but not limited to, nonvolatile media, volatile media, and transmission media. Non-volatile media include, for example, optical or magnetic disks, such as the storage device 1608. Volatile media includes dynamic memory, such as the, DVD, any other optical medium, punch cards, paper tape, any other physical medium with patterns of holes, a RAM, a PROM, an EPROM, a FLASH EPROM, any other memory chip or cartridge main memory 1604. Transmission media includes coaxial cables, copper wire, and fiber optics, including wires of the bus 1618. Common forms of computer readable media include, for example, a floppy disk, a flexible disk, hard disk, magnetic tape, any other magnetic medium, a CD ROM, or any other medium from which a computer can read.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method for frequency synchronization in an OFDM communication system comprising:
   receiving an Orthogonal Frequency Division Multiplexing (OFDM) signal comprising a plurality of Doppler-shifted OFDM subcarriers of a subband;
   calculating a frequency shift factor for each Doppler-shifted OFDM subcarrier of the plurality of Doppler-shifted OFDM subcarriers, thereby yielding a plurality of subcarrier-specific frequency shift factor values;
   calculating an average of the plurality of subcarrier-specific frequency shift factor values as the average frequency shift factor corresponding to the plurality of Doppler-shifted OFDM subcarriers;
   calculating, for each Doppler-shifted OFDM subcarrier, a frequency offset by multiplying the average frequency shift factor by a frequency index of the each subcarrier, the frequency offset for at least two Doppler-shifted OFDM subcarriers of the subband being different from each other; and
   compensating the frequency offset for each Doppler-shifted OFDM subcarrier for the frequency synchronization.

2. The method of claim 1, comprising:
   generating, based at least in part on a first part of the OFDM signal, auto-correlation data; and
   generating, based at least in part on a second part of the OFDM signal, mutual correlation data,
   wherein the frequency shift factor for each Doppler-shifted OFDM subcarrier of the plurality of Doppler-shifted OFDM subcarriers is calculated based, at least in part, on the auto-correlation data and the mutual correlation data.

3. The method of claim 2, wherein the first part of the OFDM signal is an OFDM symbol and the second part of the OFDM signal is a repetition of the OFDM symbol.

4. The method of claim 2, wherein the first part of the OFDM signal is an OFDM symbol and the second part of the OFDM signal is a corresponding cyclic prefix.

5. The method of claim 1, comprising:
   generating, based at least in part on a first part of the OFDM signal, first Fourier Transform data; and
   generating, based at least in part on a second part of the OFDM signal, second Fourier Transform data,
   wherein the frequency shift factor for each Doppler-shifted OFDM subcarrier of the plurality of Doppler-shifted OFDM subcarriers is calculated based, at least in part, on the first Fourier Transform data and the second Fourier Transform data.

6. The method of claim 1, comprising:
   determining, based at least in part on a first part of the OFDM signal, a first length;
   determining, based at least in part on a second part of the OFDM signal, a second length; and
   wherein the determining is based, at least in part, on the first length and the second length.

7. One or more non-transitory computer-readable storage media embodying logic when executed by a processor is configured to:
   receive an Orthogonal Frequency Division Multiplexing (OFDM) signal comprising a plurality of Doppler-shifted OFDM subcarriers of a subband;
   calculate a frequency shift factor for each Doppler-shifted OFDM subcarrier of the plurality of Doppler-shifted OFDM subcarriers, thereby yielding a plurality of subcarrier-specific frequency shift factor values;
   calculate an average of the plurality of subcarrier-specific frequency shift factor values as the average frequency shift factor corresponding to the plurality of Doppler-shifted OFDM subcarriers;
   calculate, for each Doppler-shifted OFDM subcarrier, a frequency offset by multiplying the average frequency shift factor by a frequency index of the each subcarrier, the frequency offset for at least two Doppler-shifted OFDM subcarriers of the subband being different from each other; and
   compensate the frequency offset for each Doppler-shifted OFDM subcarrier for the frequency synchronization.

8. The one or more non-transitory computer-readable storage media of claim 7, comprising logic that when executed by a processor is configured to:
   generate, based at least in part on a first part of the OFDM signal, first Fourier Transform data; and
   generate, based at least in part on a second part of the OFDM signal, second Fourier Transform data,
   wherein the frequency shift factor for each Doppler-shifted OFDM subcarrier of the plurality of Doppler-shifted OFDM subcarriers is calculated based, at least in part, on the first Fourier Transform data and the second Fourier Transform data.

9. The one or more non-transitory computer-readable storage media of claim 7, comprising logic that when executed by the processor is configured to:
   generate, based at least in part on a first part of the OFDM signal, auto-correlation data; and
   generate, based at least in part on a second part of the OFDM signal, mutual correlation data,
   wherein the frequency shift factor for each Doppler-shifted OFDM subcarrier of the plurality of Doppler-shifted OFDM subcarriers is calculated based, at least in part, on the auto-correlation data and the mutual correlation data.

10. The one or more non-transitory computer-readable storage media of claim 9, wherein the first part of the OFDM signal is an OFDM symbol and the second part of the OFDM signal is a repetition of the OFDM symbol.

11. The one or more non-transitory computer-readable storage media of claim 9, wherein the first part of the OFDM signal is a cyclic prefix of an OFDM symbol and the second part of the OFDM signal is the OFDM symbol.

12. The one or more non-transitory computer-readable storage media of claim 7, comprising logic that when executed by the processor is configured to:
   determine, based at least in part on a first part of the OFDM signal, a first length; and
   determine, based at least in part on a second part of the OFDM signal, a second length,
   wherein the frequency shift factor for each Doppler-shifted OFDM subcarrier of the plurality of Doppler-shifted OFDM subcarriers is calculated based, at least in part, on the first length and the second length.

13. A mobile system comprising:
an Orthogonal Frequency Division Multiplexing (OFDM) receiver configured to receive an OFDM signal comprising a plurality of Doppler-shifted OFDM subcarriers of a subband;
a subcarrier frequency-shift estimator interoperably coupled to the OFDM receiver, the subcarrier frequency-shift estimator configured to:
  calculate a frequency shift factor for each Doppler-shifted OFDM subcarrier of the plurality of Doppler-shifted OFDM subcarriers, thereby yielding a plurality of subcarrier-specific frequency shift factor values, and
  calculate an average of the plurality of subcarrier-specific frequency shift factor values as the average frequency shift factor corresponding to the plurality of Doppler-shifted OFDM subcarriers; and
a frequency shift bank interoperably coupled to the OFDM receiver and the subcarrier frequency-shift estimator, the frequency shift bank configured to:
  calculate, for each Doppler-shifted OFDM subcarrier, a frequency offset by multiplying the average frequency shift factor by a frequency index of the each subcarrier, the frequency offset for at least two Doppler-shifted OFDM subcarriers of the subband being different from each other, and
  compensate the frequency offset for each Doppler-shifted OFDM subcarrier for the frequency synchronization.

14. The system of claim 13, comprising a processor configured to:
  generate, based at least in part on a first part of the OFDM signal, first Fourier Transform data; and
  generate, based at least in part on a second part of the OFDM signal, second Fourier Transform data,
  wherein the frequency shift factor for each Doppler-shifted OFDM subcarrier of the plurality of Doppler-shifted OFDM subcarriers is calculated based, at least in part, on the first Fourier Transform data and the second Fourier Transform data.

15. The system of claim 14, comprising a correlator configured to:
  generate, based at least in part on a first part of the OFDM signal, auto-correlation data; and
  generate, based at least in part on a second part of the OFDM signal, mutual correlation data,
  wherein the frequency shift factor for each Doppler-shifted OFDM subcarrier of the plurality of Doppler-shifted OFDM subcarriers is calculated based, at least in part, on the auto-correlation data and the mutual correlation data.

16. The system of claim 15, wherein the first part of the OFDM signal is an OFDM symbol and the second part of the OFDM signal is a repetition of the OFDM symbol.

17. The system of claim 15, wherein the first part of the OFDM signal is a cyclic prefix of an OFDM symbol and the second part of the OFDM signal is the OFDM symbol.

* * * * *